United States Patent Office 3,555,077
Patented Jan. 12, 1971

3,555,077
BIS-CARBAMATES OF ALKYLADAMANTANES
Robert E. Moore, Wilmington, Del., assignor to Sun Oil Company, Philadelphia, Pa., a corporation of New Jersey
No Drawing. Filed Sept. 23, 1968, Ser. No. 761,877
Int. Cl. C07c 125/06
U.S. Cl. 260—482                 9 Claims

ABSTRACT OF THE DISCLOSURE

New compounds are disclosed which are 1,3-bis-carbamates of certain alkyladamantanes of the $C_{11}$–$C_{13}$ range, an example being 5,7 - dimethyladamantane - 1,3 - diol, bis(6-methylcarbamate). These compounds exhibit fungicidal activity particularly against the soil fungus, *Fusarium solani*.

BACKGROUND OF THE INVENTION

This invention relates to new compounds which are 1,3-bis-carbamates of certain alkyladamantanes. These compounds have utility as soil fungicidal agents.

The adamantane nucleus has ten carbon atoms, four of which are bridgehead carbons that are equivalent to each other, as can be seen from the following typographical representation:

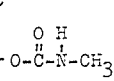

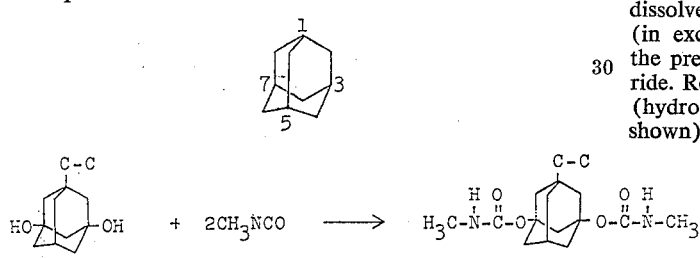

As shown, the bridgehead carbon atoms customarily are designated by the numerals 1, 3, 5 and 7 respectively.

In the prior art 1-adamantyl carbamate has been reported by Haas et al., J.A.C.S./88:9/1988–1992 (1966). The method of preparation involved reacting phosgene with 1-adamantanol in benzene solution at 4° C. in the presence of pyridine as catalyst to form 1-adamantyl chloroformate and then reacting the latter in benzene solution at ambient temperature with ammonia to form the monocarbamate.

Gerzon et al., J. Med. Chem., 10, 603–606 (1967), used an analogous method to prepare the monocarbamate from 3,5,7-trimethyladamantan-1-ol.

The preparation of $C_{11}$–$C_{13}$ methyl- and/or ethyl-substituted adamantanes by the isomerization of tricyclic naphthenes by means of an aluminum halide or HF—BF$_3$ catalyst has been described by several references including the following: Schneider U. S. Pat. No. 3,128,316, dated Apr. 7, 1964; Janoski et al. U.S. Pat. No. 3,275,700, dated Sept. 27, 1966; Schleyer et al., Tetrahedron Letters No. 9, pp. 305–309 (1961); and Schneider et al., J.A.C.S., vol. 86, pp. 5365–5367 (1964). The isomerization products can have the methyl and/or ethyl groups attached to the adamantane nucleus at either bridgehead or nonbridgehead positions or both, although completion of the isomerization reaction favors bridgehead substitution. Examples of alkyladamantanes made by such isomerization are methyladamantanes, dimethyladamantanes, ethyldamantanes and methylethyladamantanes.

Procedures suitable for converting such methyl- and/or ethyl-substituted adamantanes to the corresponding 1,3-dihydroxyalkyladamantanes have been described in Schneider U.S. Pat. No. 3,356,741, dated Dec. 5, 1967 and Moore U. S. Pat. No. 3,383,424, dated May 14, 1968.

SUMMARY OF THE INVENTION

The invention embraces, as new compounds 1,3-bis-carbamates of alkyladamantane having the formula

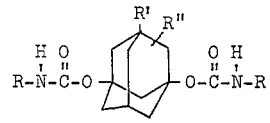

wherein each of R and R′ is methyl or ethyl and R″ is a bridgehead or nonbridgehead substituent which is hydrogen, methyl or ethyl when R′ is methyl and which is hydrogen or methyl when R′ is ethyl, remaining substituents on the adamantane nucleus being hydrogen. These bis-carbamates are all colorless crystalline solids. They exhibit fungicidal activity particularly against the soil fungus *Fusarium solani* which is known to cause widespread damage to the root systems of various plants.

DESCRIPTION

The bis-carbamate compounds of the invention can be prepared from the corresponding 1,3-dihydroxyalkyladamantanes. A preferred procedure comprises reacting the diol in a suitable solvent and in the presence of a catalyst with at least two moles of methyl or ethyl isocyanate. For example, 5-ethyl-1,3-dihydroxyadamantane (1 mole) dissolved in acetone is admixed with methyl isocyanate (in excess of 2 moles) and the mixture is refluxed in the presence of a catalytic amount of dibutyl tin dichloride. Reaction occurs according to the following equation (hydrogen atoms in the alkyladamantane moiety not being shown):

While the starting diol is soluble in the acetone solvent, the bis-carbamate product is considerably less so and hence will precipitate from solution when the reaction mixture is cooled. The product in this instance can be designated as 5-ethyladamantane-1,3-diol,bis(N-methylcarbamate).

As is apparent from the foregoing equation, the alkyladamantane moiety undergoes no change in structure during this reaction and is the same in the product as in the starting diol. In other words the R′ and R″ substituents on the adamantane nucleus are unaffected and remain in place during the reaction.

When ethyl isocyanate is substituted for methyl isocyanate in the foregoing reaction, the N-substituted R groups will be ethyl instead of methyl.

The compounds of the invention can also be prepared from the starting 1,3-dihydroxyalkyladamantanes by a procedure analogous to that used by Haas et al. and Gerzon et al., cited above. Thus the 1,3-diol, dissolved in acetone rather than benzene, can be reacted in the presence of pyridine with two mole of phosgene per mole of 1,3-diol to form the corresponding bis-chloroformate. The latter, suitably in benzene solution, is then reacted with either methylamine or ethylamine to produce the desired bis-carbamate product.

As starting material for either of the foregoing preparative procedures, it is permissible to use any dibridgehead diol of a $C_{11}$ to $C_{13}$ alkyladamantane which has a methyl or ethyl group substituted at one of the other bridgehead positions. The starting diol may or may not also have a second methyl or ethyl group substituted either at a nonbridgehead position or at the fourth bridgehead carbon atom. More specifically, the starting material embraces all of the dibridgehead diols of the following alkyladamantane hydrocarbons:

1-methyladamantane
1-ethyladamantane
1,3-dimethyladamantane
1-ethyl-3-methyladamantane
1,2-dimethyladamantane
1,4-dimethyladamantane
1-methyl-2-ethyladamantane
1-methyl-4-ethyladamantane
1-ethyl-2-methyladamantane
1-ethyl-4-methyladamantane The bis-carbamate products derived from diols of the $C_{11}$–$C_{13}$ alkyladamantanes specified above are all high melting crystalline solids which are soluble in dimethylformamide, dimethylsulfoxide and hot ethanol. The crude bis-carbamate products obtained by means of the procedures described above can readily be purified by recrystallization from ethanol.

The bis-carbamates of the invention are useful as soil fungicidal agents, particularly exhibiting antifungal activity against *Fusarium solani*. This soil pathogen is known to cause widespread damage to the root systems of various plants, such as beans, cucumber, gourd, muskmelon, pumpkin, squash, watermelon and various ornamental plants. *Fusarium solani* can cause the roots of the plant to blacken and rot, thus reducing the viability of the plant. The present procedures have utility in combating this type of plant damage.

EXAMPLE 1

Preparation of bis-carbamate from 5,7-dimethyladamantane-1,3-diol

To a solution of 5,7-dimethyladamantane-1,3-diol (1.96 g.; 0.01 mole) in 15 ml. of acetone, an excess of methyl isocyanate (2.85 g.; 0.05 mole) and a catalytic amount of dibutyl tin dichloride were added. The mixture was heated under reflux for 4–5 hours, then cooled in a Dry Ice-acetone bath and filtered to recover the product which had precipitated. The crude product was recrystallized from ethanol to yield a white crystalline product (2.17 g.; 70% yield on theory) having a melting point of 265–266° C. The product was identified by NMR, IR and mass spectroscopy as 5,7-dimethyladamantane-1,3-diol, bis(N-methylcarbamate), which corresponds to the following formula (hydrogen atoms in the alkyladamantane moiety again being omitted):

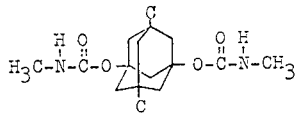

EXAMPLE 2

Fungicidal activity

Tests were made to determine the activity as a soil fungicide of the bis-carbamate product of Example 1, in comparison with the well known commercial fungicide "Captan" which is N-trichloromethylmercapto - 4 - cyclohexene - 1,2 - dicarboxamide. The soil pathogen used was *Fusarium solani* and the type of plant involved was bean. The tests were carried out by blending sterile soil with spores of *Fusarium solani* in a suitable concentration and with the test compound which was added to the soil in a suitable solvent (e.g., dimethylformamide). The soil blends were placed in a number of pots and were seeded, and the containers were then placed in a greenhouse under plant growth conditions. Controls were run on the sterile soil and solvent only, on sterile soil plus the test compound in solvent, and on sterile soil plus *Fusarium solani* inoculant and solvent. At least three replicates of each test unit were made. After the plants had grown for a suitable time, control effectiveness of the test compounds was determined by ascertaining the number of plants infected with the fungus as compared to total number of plants involved. Results, shown below, are expressed as percent of the plants protected against infection.

| | Protection, percent |
|---|---|
| Bis-carbamate of Example 1 | 83 |
| Commercial fungicide | 72 |

The results show that the bis-carbamate of the present invention gave somewhat better protection than the commercially available fungicide used for comparison. In these tests it was found that neither of the test compounds had any phytotoxic effect on the plants.

The foregoing results show that the bis-carbamate has good antifungal activity with respect to the fungus, *Fusarium solani*, which is well known to be a difficult soil pathogen to control. Similar results are obtained when other bis-carbamates as herein specified are substituted for the bis-carbamate of Example 1 in the control of *Fusarium solani*. These compounds do not, however, have a wide spectrum of activity against soil fungi but are mainly specific against infection by *Fusarium solani*. For example, when tests similar to the foregoing were run using *Pythium asphanidernatum*, only 14% protection was obtained; and in tests made with *Sclerotium rolfsii* and *Rhizoctonia solani* no fungicidal activity was detected.

The invention claimed is:

1. A 1,3-bis-carbamate of alkyladamantanes having the formula

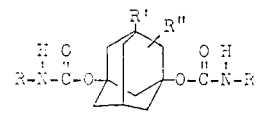

wherein each of R and R' is methyl or ethyl and R" is a bridgehead or nonbridgehead substituent which is hydrogen, methyl or ethyl when R' is methyl and which is hydrogen or methyl when R' is ethyl, remaining substituents on the adamantane nucleus being hydrogen.

2. A compound according to claim 1 wherein R" is located at a bridgehead position.

3. A compound according to claim 2 wherein R is methyl.

4. A compound according to claim 2 wherein R' is methyl.

5. A compound according to claim 4 wherein R" is methyl.

6. A compound according to claim 1 wherein R is methyl.

7. A compound according to claim 1 wherein each of R, R' and R" is methyl.

8. 5,7-dimethyladamantane - 1,3 - diol, bis(N-methylcarbamate).

9. 5 - ethyladamantane - 1,3 - diol, bis(N - methylcarbamate).

References Cited

Fort, R. C., Chem. Rev. vol. 64, p. 289.

LORRAINE A. WEINBERGER, Primary Examiner

P. J. KILLOS, Assistant Examiner

U.S. Cl. X.R,
260—463; 424—300